United States Patent [19]

Sumiya et al.

[11] Patent Number: 5,161,280
[45] Date of Patent: Nov. 10, 1992

[54] WINDSHIELD WIPER WITH VARIABLE ARM PRESSURE

[75] Inventors: Kazuhiro Sumiya, Hekinan; Tokihiko Yamamoto, Kariya; Ryoichi Fukumoto, Nagoya; Kazuhide Itagaki, Toyota; Masao Ohhashi, Kariya, all of Japan

[73] Assignee: Aisin Seiki Kabushiki Kaisha, Kariya, Japan

[21] Appl. No.: 677,181

[22] Filed: Mar. 29, 1991

[30] Foreign Application Priority Data

Mar. 29, 1990 [JP] Japan .................................. 2-82456
Mar. 31, 1990 [JP] Japan .................................. 2-85887

[51] Int. Cl.$^5$ .............................................. B60S 1/32
[52] U.S. Cl. .................................................. 15/250.2
[58] Field of Search ........... 15/250.20, 250.34, 250.19, 15/250.35

[56] References Cited

U.S. PATENT DOCUMENTS

| 3,035,296 | 5/1962 | Deibel | 15/250.23 |
| 4,370,774 | 2/1983 | Bienert et al. | 15/250.20 |
| 4,993,102 | 2/1991 | Honda et al. | 15/250.20 |
| 5,056,182 | 10/1991 | Fukumoto et al. | 15/250.20 |

FOREIGN PATENT DOCUMENTS

| 201838 | 4/1955 | Australia | 15/250.34 |
| 2314724 | 10/1974 | Fed. Rep. of Germany | 15/250.34 |
| 605228 | 5/1960 | Italy | 15/250.20 |
| 0086840 | 7/1981 | Japan | 15/250.20 |
| 0138450 | 8/1982 | Japan | 15/250.20 |
| 62-59151 | 3/1987 | Japan . | |
| 897530 | 5/1962 | United Kingdom | 15/250.20 |

Primary Examiner—Harvey C. Hornsby
Assistant Examiner—Gary K. Graham
Attorney, Agent, or Firm—Finnegan, Henderson, Farabow, Garrett & Dunner

[57] ABSTRACT

A windshield wiper assembly provides variable contact pressure between the wiper blade and the windshield by utilization of a lever arm variably movable within a cam slot as the windshield wiper reciprocates across the windshield. A spring provides a bias force between the wiper arm and the lever arm of the assembly. The spring force acts through a moment arm to urge the wiper blade into contact with the windshield. The magnitude of the moment arm through which the spring bias force acts to urge the wiper blade into contact with the windshield is adjusted in accordance with the position of the wiper blade on the windshield as a result of the predetermined configuration of the cam slot which acts on the lever arm to which one end of the spring is attached. In this manner, the contact pressure between the wiper blade and the windshield is reduced at the extreme ends of the windshield wiper throw so as to reduce the noise typically associated with the windshield wiper reversing direction on the windshield.

1 Claim, 8 Drawing Sheets

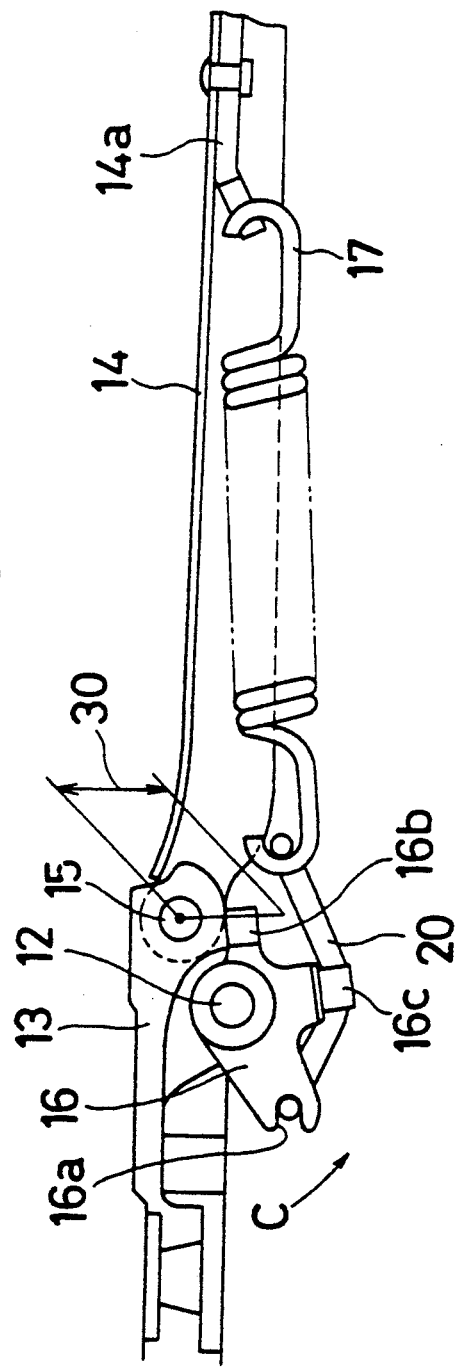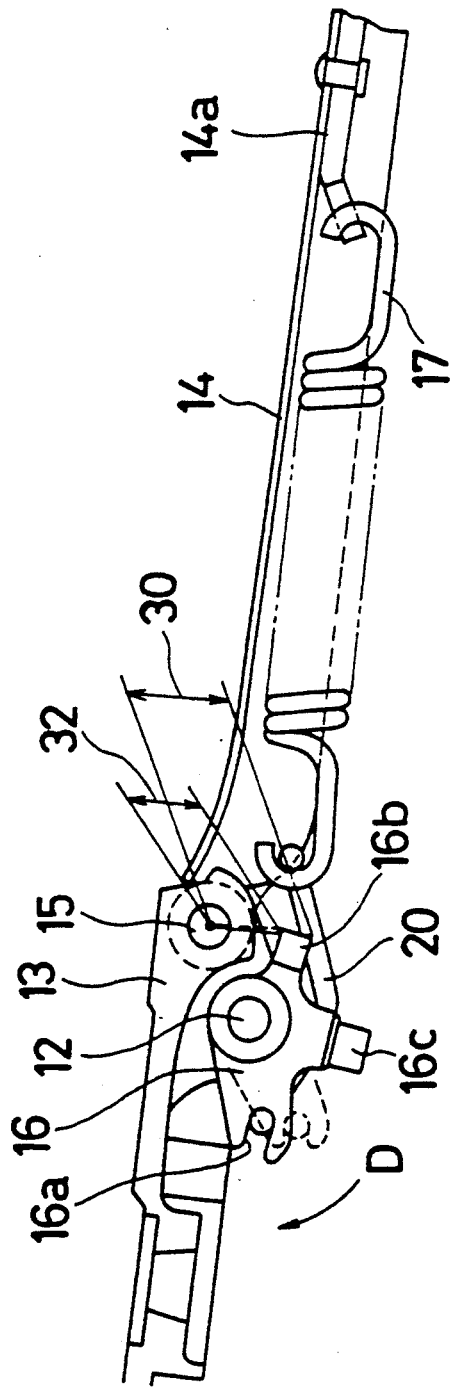

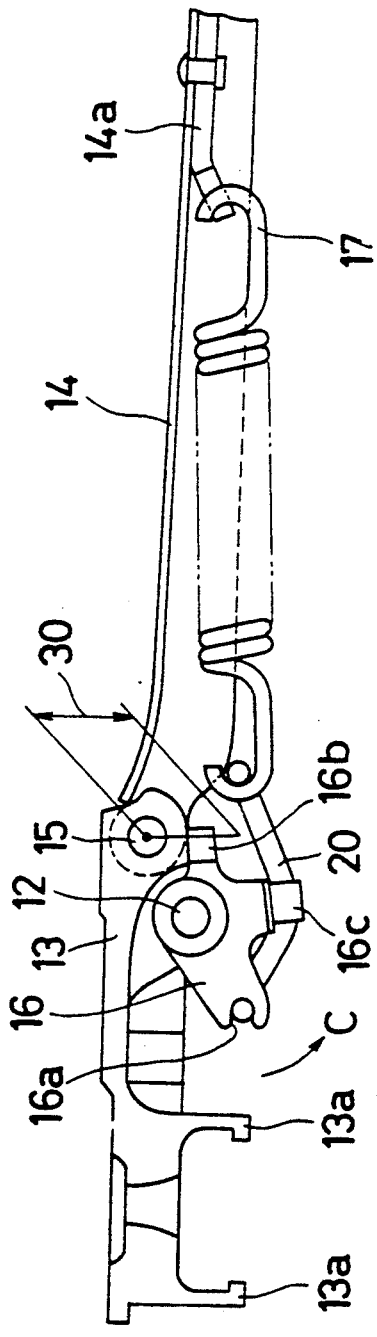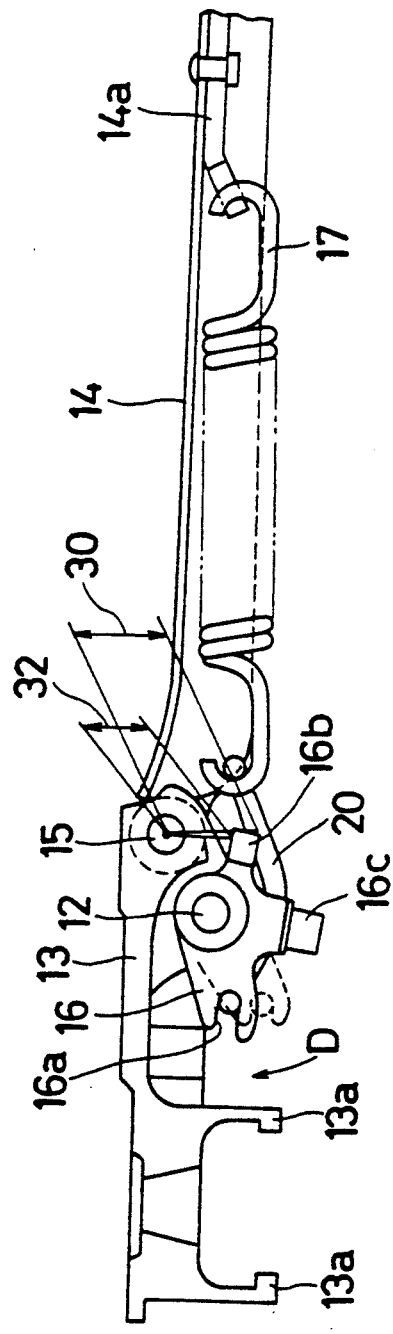

WINDSHIELD WIPER WITH VARIABLE ARM PRESSURE

BACKGROUND OF THE INVENTION

1. Field of the Invention

The present invention relates to windshield wipers, and in particular, windshield wipers with variable arm pressure.

2. Description of the Related Art

In recent years, there has been a strong requirement for reducing the noise which results during windshield wiper operation when the windshield glass is struck by the blade as the wiper reverses direction. As shown in FIG. 7, this reversal noise is related to the pressure exerted by the tip of the wiper arm (arm pressure); the higher the arm pressure, the louder the reversal noise. Thus, reducing the arm pressure at the points where the wiper reverses direction would decrease the reversal noise.

A variable arm pressure windshield wiper device is disclosed in Japanese Patent Publication Sho 62-59151. That device utilizes motor operation via a link to change the position of the distal end of the spring's attachment point on the wiper arm in order to vary the pressure on the arm.

However, in the device disclosed in the referenced Japanese Publication, the reversal point of the wiper arm must be detected in order to operate the motor. This arrangement is not advantageous in that response time is poor, reliability is low, and the complexity of the device is relatively high.

SUMMARY OF THE INVENTION

Thus, the object of the invention is to provide an improved windshield wiper configuration which reduces the noise of wiper blade engagement with the windshield, particularly at the points where the wiper reverses direction.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The preferred embodiments of the present invention solve the problem heretofore described in prior art wipers by providing a crank arm having a distal end which is offset from the central axis of a reciprocating shaft which moves the wiper. The crank arm has a cam slot configured in its distal end and is fixed relative to the reciprocating shaft for movement therewith. A crank lever is engaged with the cam slot in the crank arm for adjusting the moment force applied to urge the wiper against the windshield. The moment force is supplied by a spring which is attached to the crank lever at one end and to the wiper arm at the other end. The cam slot is configured to reduce the moment force urging the wiper against the windshield when the movement of the wiper approaches the position at which it reverses direction.

It is to be understood that both the foregoing general description and the following detailed description are exemplary and explanatory only and do not limit the scope of the invention, which scope is defined explicitly by the appended claims.

BRIEF DESCRIPTION OF THE DRAWINGS

The accompanying drawings, which are incorporated in and constitute a part of this specification, illustrate alternative embodiments of the invention and, together with the description, serve to explain the principles of the invention.

FIGS. 4 and 5 are details of the wiper of FIG. 2 related to the diagram of FIG. 3;

FIGS. 9 and 10 are details of the wiper of FIG. 8;

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
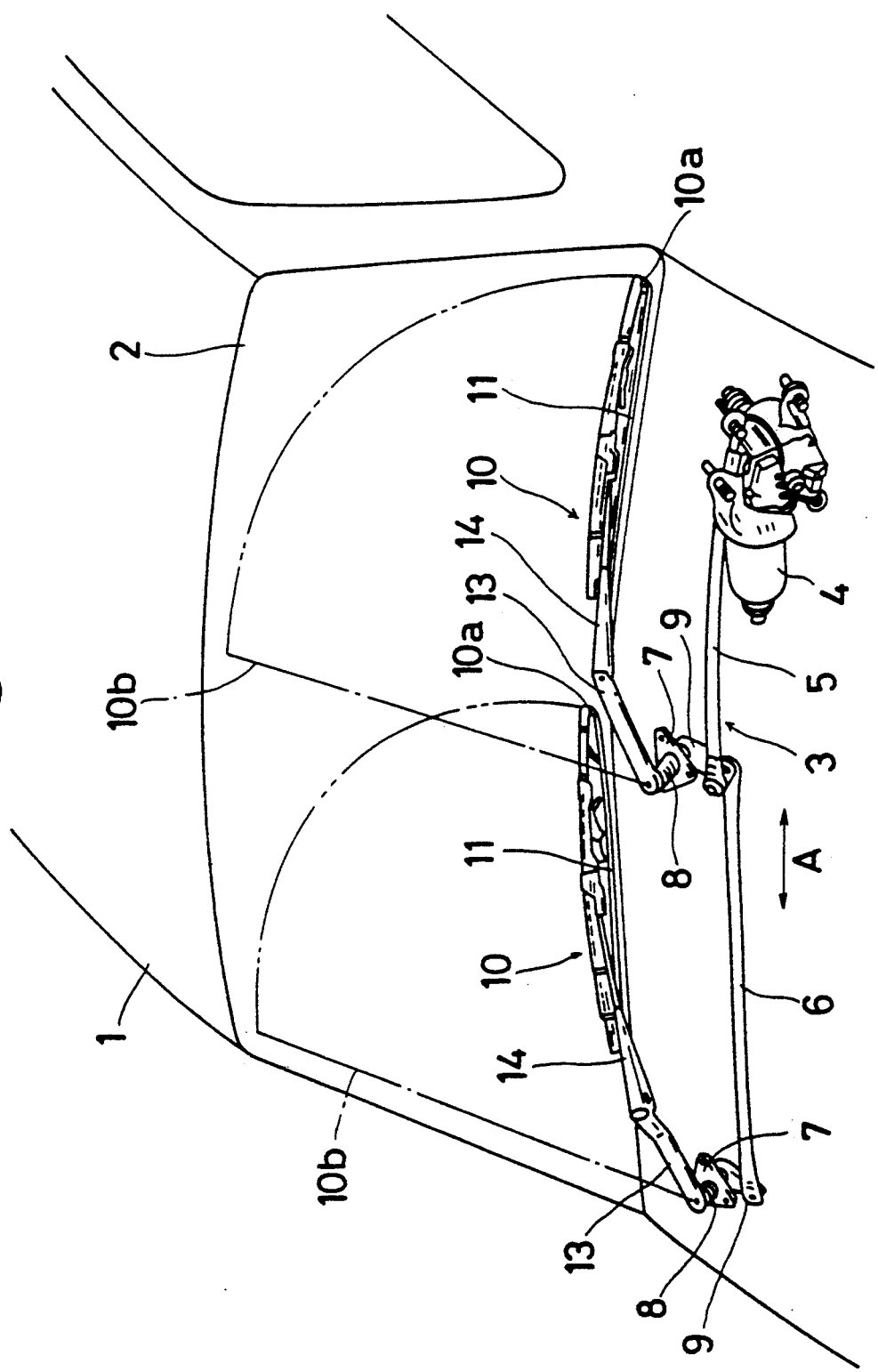
FIG. 1 is a perspective view of the variable arm pressure windshield wiper device of this invention shown affixed to a vehicle.

With reference to FIG. 1, a windshield wiper device 3 is positioned at the lower part of the windshield 2 of the vehicle 1. Wiper device 3 is linked to a motor 4 at one end of a rod 5. Rod 6 is attached to rod 5 at its opposite end. Rods 5 and 6 are pivotally attached to respective wiper housings 7. Housings 7 are attached to links 9 which reciprocally rotate about the center of respective rotating shafts 8. Each rotating shaft 8 is linked to a windshield wiper 10, and wiper blades 11 are attached to wipers 10 to wipe windshield 2.

In the above described windshield wiper device 3, the motor rotates in one direction, and rods 5 and 6 are reciprocated in the directions shown by double headed arrow A. This reciprocation of rods 5 and 6 causes shafts 8 to reciprocate over a specific angular range. The rotation of shafts 8 causes wipers 10 to rotate reciprocally between a lower rotational position 10a and an upper rotational position 10b. This allows wiper blade 11 to wipe the windshield glass 2 over the area between lower rotational position 10a and upper rotational position 10b.

Figure 2:
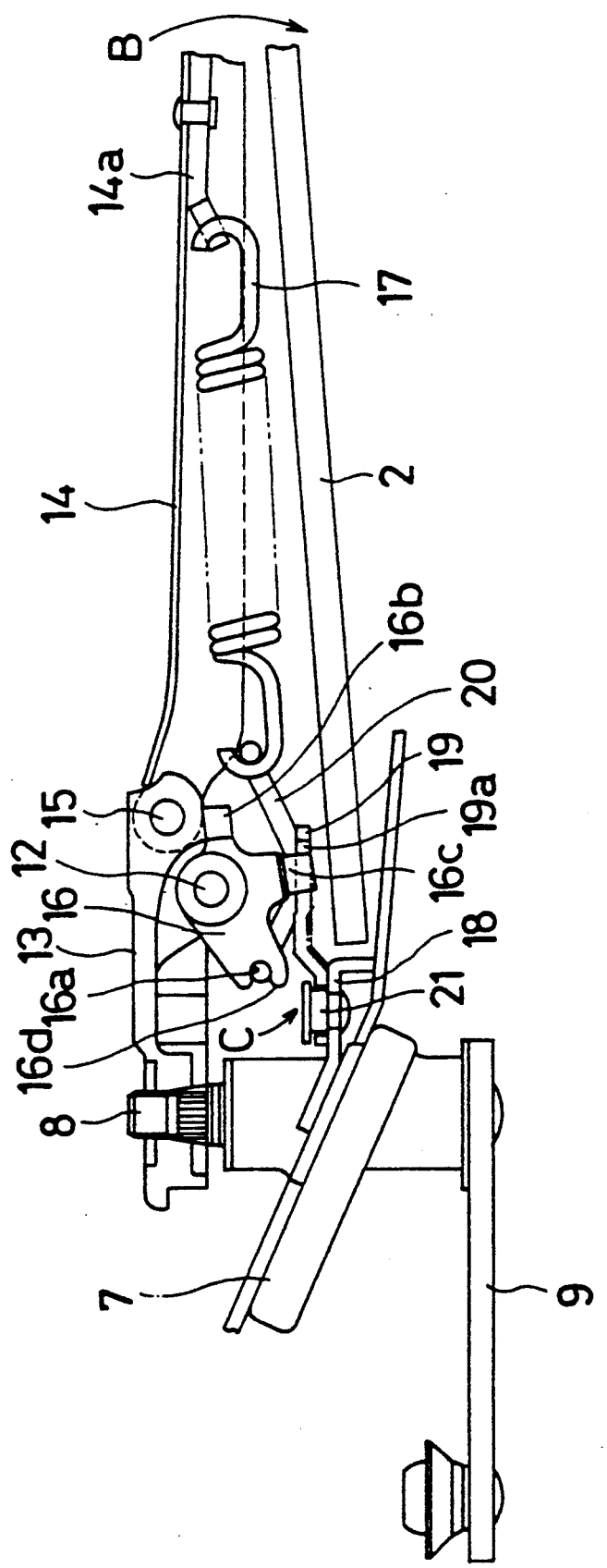
FIG. 2 is a cross-sectional view of the variable arm pressure windshield wiper device of FIG. 1.

As shown in FIGS. 1 and 2, each housing 7 supports the respective reversing shaft 8 so that it is capable of rotating in a plane which is substantially perpendicular to the windshield glass 2. A wiper head 13 is attached to and extends from the top portion of each shaft 8 for rotation with the shaft. A pivot shaft 15 attaches a wiper arm 14 to wiper head 13 in a manner which is substantially orthogonal to the direction of rotation of the wiper head so that the wiper arm 14 can be moved into and out of contact with the windshield. A wiper blade 11 is affixed to the end of the wiper arm. A crank lever 16 is pivotally attached to wiper head 13 via a pivot shaft 12. On one end of crank lever 16 and on one end of wiper arm 14 attachment fixtures 16a and 14a are provided. A spring 17, comprising a spring means, biasedly connects attachment fixture 14a and attachment fixture 16a via a spring hook 20. One end of spring 17 is normally positioned lower than the position described by a line joining the pivot shaft 15 and the attachment fixture 14a, as shown in FIG. 2. This causes the bias force of spring 17 to apply a moment force to wiper arm 14 which urges wiper arm 14 in direction B as shown in FIG. 2 around a rotational center defined by pivot shaft 15. In this manner, wiper blade 11 is pressed against the windshield glass 2 creating an arm pressure. The arm pressure of blade 11 makes it possible for the blade 11 to wipe the windshield glass 2. The bias force of spring 17 causes lever 16 to rotate in the direction C shown in FIG. 2 around pivot shaft 12. Lever 16 includes an abutment 16b which engages wiper head 13 to restrict rotation in direction C.

A crank arm 19 is supported by a bracket 18 extending from housing 7. Crank arm 19 is offset with respect to shaft 8 toward the end of the wiper arm 14, and pin 21 permits rotation of crank arm 19 in a direction parallel to wiper head 13. An elongated cam slot 19a is formed in crank arm 19. A pin 16c formed on crank lever 16 engages cam slot 19a.

Figure 3:
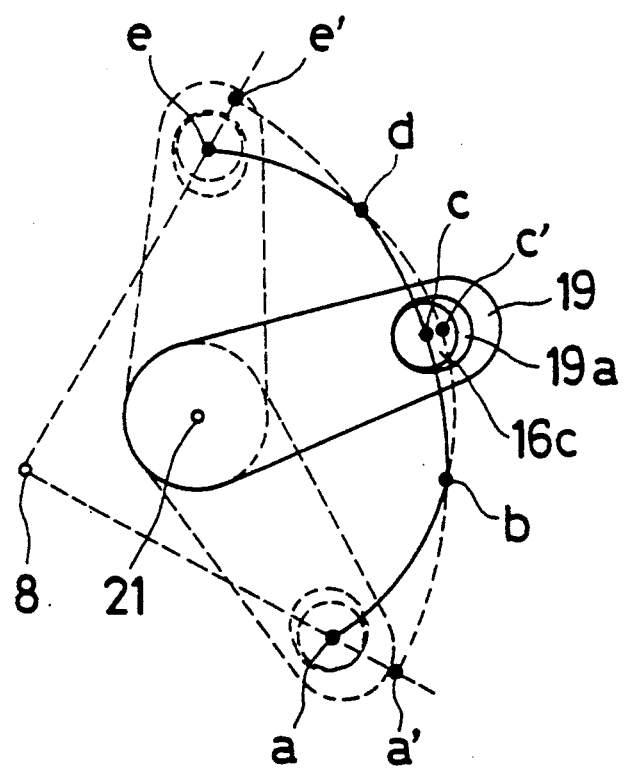
FIG. 3 is motion diagram illustrating the relative motion of selected parts of the wiper of FIG. 2 as it is reciprocated across a windshield.

As shown in FIG. 3, pin 16c of crank lever 16 rotates around rotational shaft 8 through the path defined by a'—b—c—d—e'. Also, pin 16c rotates around pin 21 in elongated hole 19a through the path defined by a—b—c'—d—e.

Figure 6:
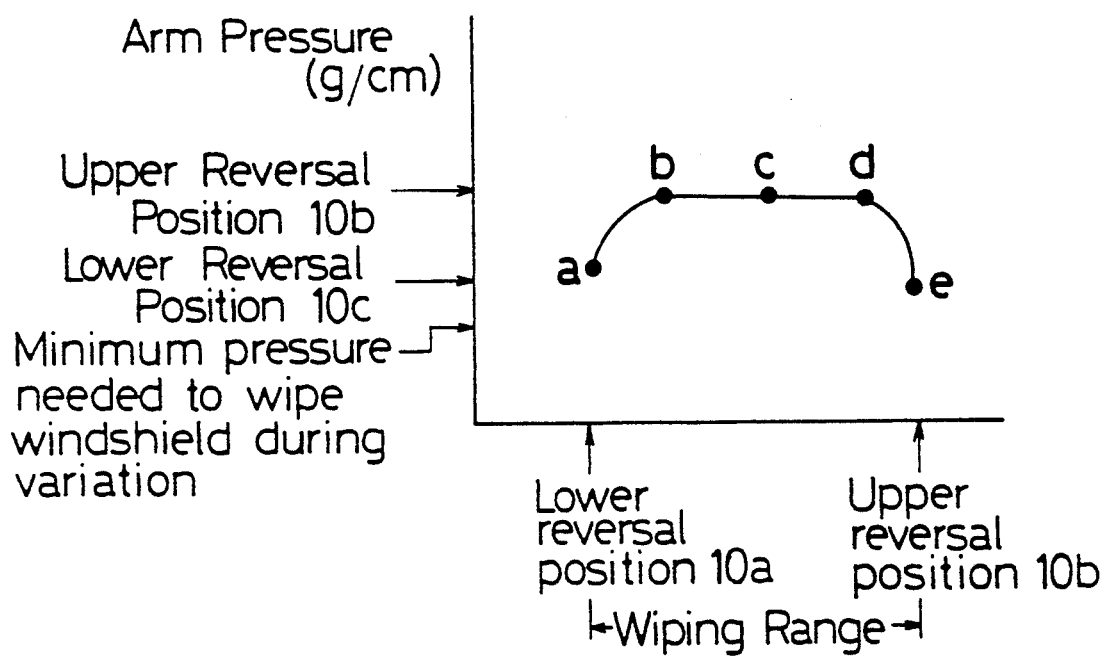
FIG. 6 is a graph illustrating arm pressure vs. wiper position in a wiper embodying the present invention.
Figure 7:
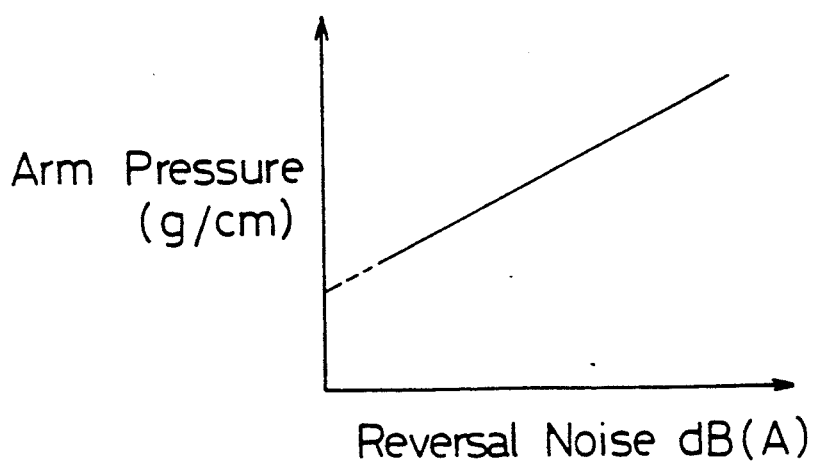
FIG. 7 is a graph illustrating arm pressure vs. reversal noise.

When motor 4 rotates wiper head 13, pin 16c rotates as described above with reference to FIG. 3 with point "a" corresponding to the lower reversal position 10a of the wiper, and point "3" corresponding to the upper reversal position of the wiper. As the wiper moves between positions b—c'—d, there is a pushing force being exerted by cam slot 19a on pin 16c and crank lever 16 tries to rotate in the direction C as shown in FIG. 4. However, due to contact between the wiper head 13 and stopper 16a on crank lever 16, this rotation is restricted, so pin 16c rotates through the path defined by b—b'—d. Due to this, in the b—c—d interval of FIG. 3, the line of action of the bias force of spring 17 is shifted and the moment arm is as shown by 30 in FIG. 4. As a result, in the b—c—d interval, the moment force exerted on attachment fixture 14a by spring 17 is of a first magnitude, and the arm pressure exerted by blade 11 on the windshield 2 is the standard pressure. Between the paths defined by a—b and d—e, there is a pulling force placed on pin 16c by cam slot 19a, and crank lever 16 rotates around pivot shaft 12 as shown by the solid line D in FIG. 5. Because of this, in the a—b and d—e intervals, the line of action of the bias force of spring 17 is shifted and the arm pressure exerted by blade 11 has a moment arm shown by 32 in FIG. 5. As a result, during the a—b and the d—e intervals, the moment force on the attachment fixture 14a applied by spring 17 is lower than that applied during the b—c—d interval. Thus, as shown in FIG. 6, the pressure of the blade 11 against the windshield 2 in the a—b and d—e intervals is lower than the standard pressure.

The arm pressure described above is typically set at a level which is higher than the minimum arm pressure which would be needed to wipe the windshield 2.

As described above, crank lever 16 and crank arm 19 are linked via pin 16c and cam slot 19a and, in addition, the rotational center of crank arm 19 is offset from the rotational center of crank lever 16 so that the normal reciprocating movement of the wiper 10 is utilized and the arm pressure exerted by blade 11 is reduced in the area of the lower reversal position 10a and the upper reversal position 10b. This makes it possible to achieve reduced reversal noise in lower reversal position 10a and upper reversal position 10b. Furthermore, the structure used to achieve this is simple, thus providing low cost and weight. In addition to those advantages, the response characteristics for wiper 10 are excellent, and throughout the reciprocal rotational range of the wiper the arm pressure is varied very precisely at the prescribed positions, i.e., the lower reversal position 10a and the upper reversal 10b. This arrangement provides good reliability.

Figure 8:
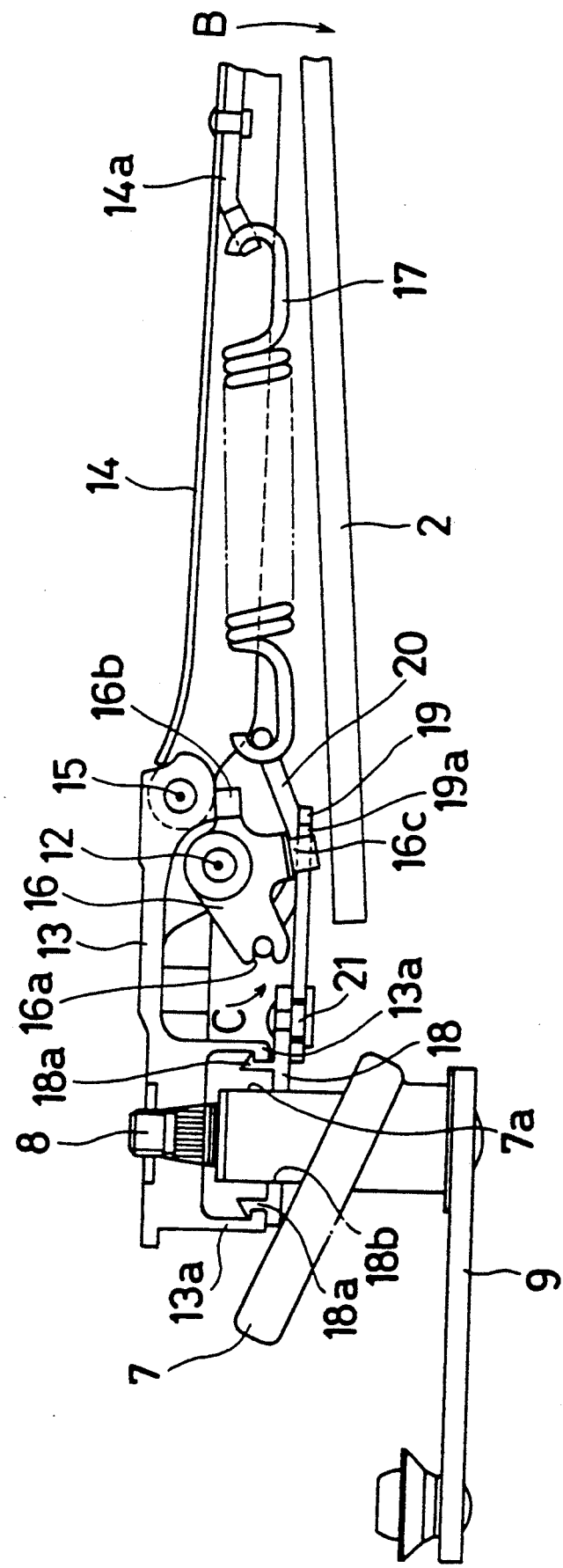
FIG. 8 is a second embodiment of the variable arm pressure windshield wiper device embodying the present invention.
Figure 11:
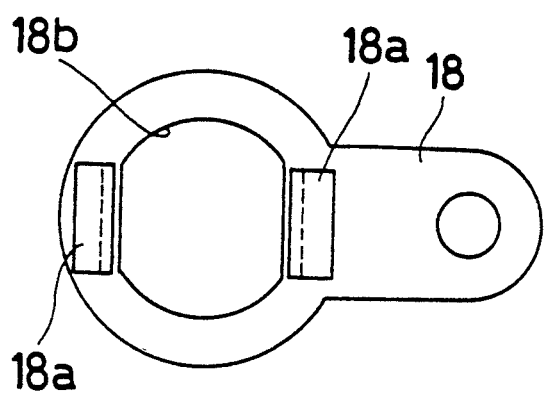
FIG. 11 is a top view of the bracket 18.
Figure 12:
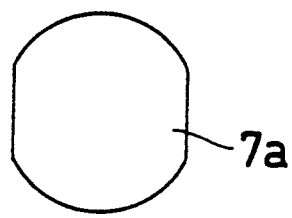
FIG. 12 is a cross-sectional view of the top portion of the housing of the wiper.
Figure 13:
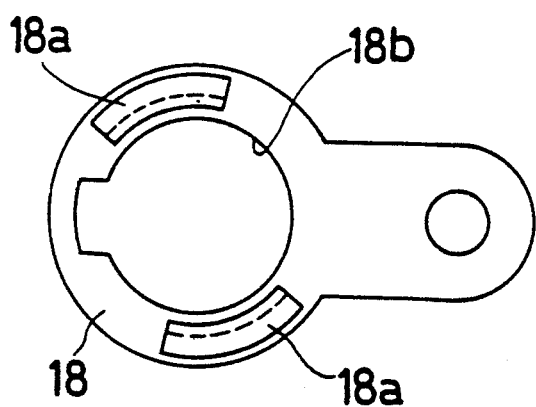
FIGS. 13 and 14 are alternative embodiments of the bracket and housing configurations shown in FIGS. 11 and 12, respectively.
Figure 14:
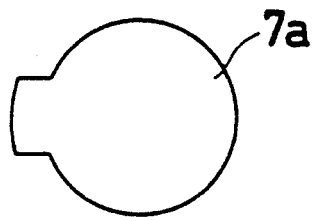

Next, a second embodiment of the present invention will be described. In this example, as shown in FIGS. 8 and 11, the wiper head 13 is held by bracket 18 through the attachment fixtures 13a formed on the wiper head and mating attachment fixtures 18a formed on bracket 18. An engagement hole 18b in a dihedrally truncated circular shape is formed in the bracket, and an engagement shaft 7a of the same shape is formed on the housing 7 as shown in FIG. 12. The engagement of shaft 7a and the hole 18b holds the bracket 18 against rotation with respect to the housing 7. This bracket supports crank arm 19 via pin 21 so that it is offset with respect to the rotating shaft 8 in the direction toward the end of the wiper arm so that it can rotate parallel to the wiper head. Cam slot 19a is formed in crank arm 19, and engages pin 16c which is formed in the other end of crank lever 16. During assembly, since the pin 16c is already engaged in the elongated hole 19a, the wiper head may be attached to the rotating shaft simply by engaging the bracket 18 into the housing. This greatly improves the efficiency of the assembly operation. One may also use a key shaped engagement between the hole 18b on bracket 18 and the engagement shaft 7a on the housing as shown in FIGS. 13 and 14.

In this embodiment, in addition to the crank arm being held by the bracket in the wiper head, it is engaged so that it cannot rotate in the housing. This makes it possible to place all of the component parts into the wiper head as one assembly. By doing this, assembly is simplified because the wiper head needs only to be pivotally attached to the housing to complete assembly. This makes the assembly operation more efficient.

Additional advantages and modifications to the preferred embodiments of the present invention described above will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claim and their equivalents.

What is claimed is:

1. A windshield wiper capable of providing variable arm pressure against a windshield, comprising:
   a housing;

a rotational shaft, having a central axis, extending through said housing;

means for reciprocating said shaft through a path corresponding to the travel of the windshield wiper through reversing strokes on the windshield;

a wiper head portion having a proximal end and a distal end, said proximal end being attached to said shaft for reciprocating rotation with said shaft;

a wiper arm pivotally attached at one end to said distal end of said wiper head, said wiper arm having a wiper blade attached thereto for wiping the windshield, said wiper arm being pivotable in a plane substantially orthogonal to the windshield so as to permit the wiper arm to move into and out of contact with said windshield;

a crank arm attached to and extending from said housing, said crank arm having a distal end which is offset from said central axis of said shaft in a direction substantially parallel to said wiper head, said crank arm having a cam slot configured in its distal end;

a crank lever pivotally attached to said wiper head, said crank lever being pivotal in substantially the same direction as said wiper arm, said crank lever having a first abutment for engagement with said wiper head to limit pivotal rotation of said crank lever in a first direction, a lever pin for travel in said cam slot of said crank arm, and a hook portion;

spring means for biasedly connecting said wiper arm to said hook portion of said lever arm, the pivotal position of said hook portion relative to the pivotal attachment of the wiper arm to the distal end of the wiper head portion establishing a variable moment force to said wiper arm for urging the wiper blade against said windshield; and said cam slot of said crank arm being configured to pivot said crank lever from a normal position in which said first abutment is in engagement with said wiper head to a disengaged position thereby to adjust the magnitude of the moment force applied by said spring means to said wiper arm from a normal wiping force during a medial portion of each wiper stroke to a reduced wiping force at opposite ends of each wiper stroke.

* * * * *